FREQUENCY SHIFT SIGNALING SYSTEM WITH AUXILIARY CONTROL OF PULSE REGENERATOR IN THE ABSENCE OF DATA SIGNALS

Filed Jan. 2, 1964 2 Sheets-Sheet 1

INVENTOR.
CHARLES G. DEN HERTOG
BY
Frank R. Trifari
AGENT

Jan. 31, 1967 C. G. DEN HERTOG 3,302,114

FREQUENCY SHIFT SIGNALING SYSTEM WITH AUXILIARY CONTROL OF PULSE REGENERATOR IN THE ABSENCE OF DATA SIGNALS

Filed Jan. 2, 1964 2 Sheets-Sheet 2

INVENTOR.

CHARLES G. DEN HERTOG

BY

Frank R. Trifari

AGENT

United States Patent Office 3,302,114
Patented Jan. 31, 1967

3,302,114

FREQUENCY SHIFT SIGNALING SYSTEM WITH AUXILIARY CONTROL OF PULSE REGENERATOR IN THE ABSENCE OF DATA SIGNALS

Charles Govert den Hertog, Hilversum, Netherlands, assignor to North American Philips Company, Inc., New York, N.Y., a corporation of Delaware Filed Jan. 2, 1964, Ser. No. 335,263
Claims priority, application Netherlands, Jan. 2, 1963, 287,379
4 Claims. (Cl. 325—30)

The invention relates to a transmission system for the transmission of coded intelligence from a transmitting device to a receiving device with the aid of signals in the form of mark and space elements. The mark and space elements frequency-modulated on a carrier signal in the transmitter during successive periods of a time signal are applied at the receiver to a pulse regenerator by way of a frequency demodulator. The regenerator regenerates the mark and space elements obtained by demodulation at time instants determined by a time signal regained at the receiver from the mark and space elements obtained by demodulation, said time signal being generated by a time signal generator, the phase of which is controlled by the transitions between the mark and space elements.

In such transmission systems it is particularly important that the time signal generated at the receiver should have the correct phase at the beginning of the message with respect to the incoming character elements so that each incoming element is regenerated at the instant at which it can be ascertained with maximum certainty whether the incoming element is a space element or a mark element. A displacement of the instant of regeneration reduces the reliability of the intelligence transmission, since in this case interference has a greater effect.

In transmission systems of the kind set forth a time signal is generated at the receiver, the phase of which signal is controlled by the transitions between the mark and space elements in the demodulated signal, so that during an interval of rest in the transmission the phase of the time signal is not controlled at the receiver and the phase of the time signal may change. Short intervals of rest may be bridged by the use of very stable oscillators or fly-wheel circuits, but the bridging of longer intervals requires additional measures.

In order to ensure that the time signal generated at the receiver at the beginning of an item of intelligence is always in phase with the then incoming character elements, i.e. that the phase position of the time signal relative to the character elements is always the same for each message, various measures have been proposed; these have, however, various practical drawbacks.

It has been proposed, for example, to fill out the intervals of rest in the intelligence transmission with special synchronisation messages having such an address that at the receiver an analysis of the address provides the indication that the information only serves for the phase control of the time signal generator. This requires, however, comparatively complicated coding and decoding devices.

It has furthermore been proposed to include a few synchronising characters in the heading of a message, said characters adjusting the time signal generator to the correct phase before the beginning of the message proper.

However, this reduces the effectiveness of the intelligence transmission, since each message is preceded by such synchronising signs.

The invention has for its object to provide a transmission system of the kind set forth, in which the phase control of the time signal generator at the receiver end is maintained during the intervals of rest in the message transmission in a novel and simple manner without affecting the message channel at the receiver, i.e. without affecting the rest position of the receiver, characteristic of an interval of rest in the message transmission.

According to the invention the transmitting device comprises an amplitude modulator which modulates the amplitude of the carrier signal transmitted during an interval between two messages and having a constant frequency by means of an auxiliary signal derived from the time signal. The auxiliary signal modulated on the carrier signal is fed in the receiver via an amplitude detector to the time signal generator for controlling the phase of the time signal produced by the time signal generator in an interval between two items of intelligence.

The invention will now be described more fully with reference to the drawing.

Figure 1:
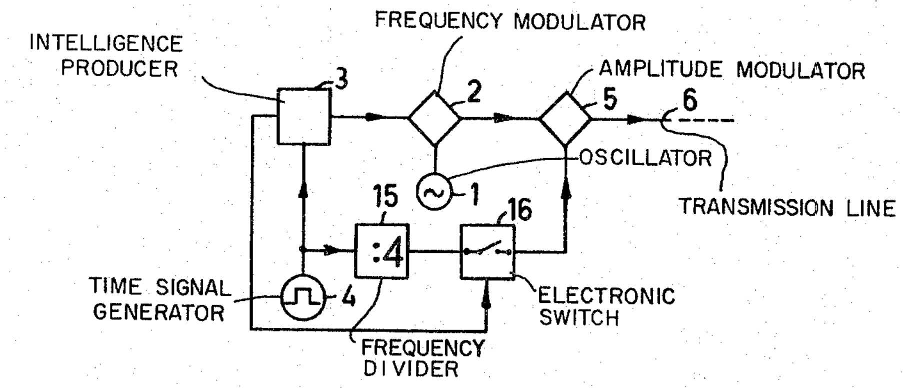
FIG. 1 shows in a block diagram a transmitting device used in the transmission system according to the invention and FIG. 2 shows the associated receiving device.

The transmitting device shown in FIG. 1 comprises a carrier wave oscillator 1, which is connected to a frequency modulator 2 controlled by an intelligence producer 3. The items of intelligence are transmitted with the aid of signals in the form of space and mark elements, which are fed by the intelligence producer 3 in successive periods of a time signal produced by a time signal generator 4 for the intelligence producer to the frequency modulator 2. The space elements modulate the carrier signal supplied by the oscillator 1 with a first frequency F1, hereinafter termed the space frequency, and the mark elements modulate the carrier signal with a second frequency F2, hereinafter termed the mark frequency. The frequencies F1 and F2 may have the values of 1300 c./s. and 2100 c./s. respectively and the rate of signalling may be 1200 Bauds. The time signal frequency of the time signal oscillator 4, corresponding to said rate of signalling is 1200 c./s. The frequency-modulated signal passes through an amplitude modulator 5, which is inoperative during the transmission of intelligence, and is fed to a transmission channel 6, for example a telephone channel.

Figure 2:
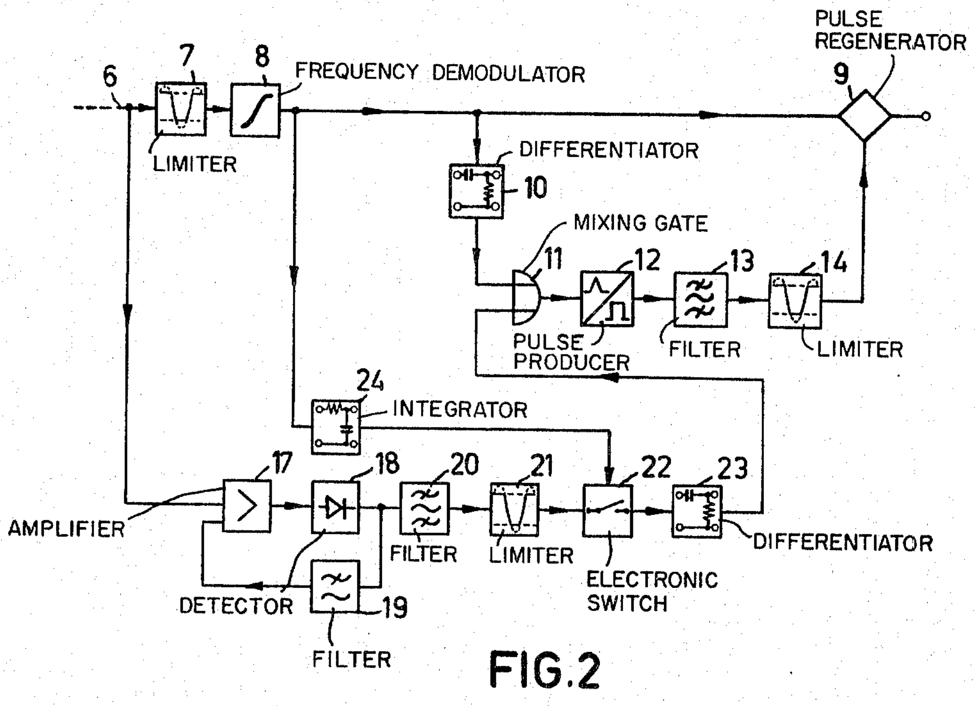

In the receiving device shown in FIG. 2 the frequency-modulated signal from the transmission channel 6 is fed through a conventional amplitude limiter 7, which may be preceded by a bandpass filter, to a frequency demodulator 8, for converting the frequencies F1 and F2 into direct voltages of opposite polarities. The direct output voltages are applied to a conventional pulse regenerator 9. The pulse regenerator regenerates the space and mark elements of the demodulated signal at time instants which are determined by a time signal generated at the receiver, said instants coinciding for example with the centers of the sign elements. At such an instant of regeneration—said instants are relatively shifted over the desired duration of a sign element—the pulse regenerator 9 regenerates the direct voltage available at the input, which voltage may be negative or positive depending upon whether the sign element is a space element or a mark element. At the next-following instant of regeneration, i.e. after the period of time of a sign element, the direct voltage then available at the input is regenerated and so forth, so that the pulse regenerator supplies at the output space and mark elements of equal durations and having a constant amplitude.

The time signal is generated at the receiver in a time signal generator circuit of a conventional type, which comprises in order of succession a differentiator 10, a mixing gate 11, a pulse producer 12 with adjustable pulse duration, a filter 13 tuned to the time signal frequency and an amplitude limiter 14. The differentiator 10 differentiates the space and mark elements emanating from the frequency demodulator 8 and thus supplies during each transition between a space element and a mark element a pulse which is fed to the pulse producer 12 via a mixing gate 11. The pulse producer 12, for example a monostable trigger circuit, converts the output pulses of the differentiator 10 into square-wave pulses having an adjustable pulse duration, the rear flank of which excites a filter 13, tuned to the time signal frequency of 1200 c./s., so that the filter produces an oscillation of a frequency of 1200 c./s., the phase of which coincides with the mean phase of the transitions between the space elements and the mark elements in the demodulated signal. The oscillation produced by the filter 13 is fed to the pulse regenerator 9 via an amplitude limiter 14, which converts the sinusoidal oscillation into a square-wave time signal. The phase of the time signal is adjusted once by the adjustment of the pulse duration of the pulse producer 12 so that the instants of regeneration determined by the leading or trailing edges of the square-wave time signal coincide with the centers of the space and mark elements obtained by demodulation.

In order to ensure that at the beginning of each item of intelligence the time signal generated at the receiver has the same phase as the then incoming sign elements, so that they are always produced at the center of the sign element, the carrier signal then emitted by the transmitting device in an interval between two items of intelligence and having the space frequency F1 is amplitude-modulated by the amplitude modulator 5. The modulator 5 is controlled by an auxiliary signal derived from the time signal oscillator 4 via a frequency divider 15 and an electronic switch 16, which is closed in the interval of rest. The switch 16 is closed by a signal which can be derived in a simple manner from the intelligence producer 3 for the indication of an interval of rest.

In the receiving device (FIG. 2) the modulated signals from the transmission channel 6 are fed to an auxiliary circuit comprising, in order of succession, a controlled amplifier 17, an amplitude detector 18, a low bandpass filter 19, which supplies from the output of the detector 18 an amplification-control-signal to the amplifier 17, a filter 20, tuned to the frequency of the auxiliary signal, an amplitude limiter 21, an electronic switch 22 and a differentiator 23. During the intelligence transmission the switch 22 is opened, so that the auxiliary circuit is interrupted. In an interval between two items of intelligence the transmitted carrier signal with the space frequency F1 constantly supplies a negative direct voltage at the output of the frequency demodulator 8, so that after given period of time following the beginning of an interval of rest an integrator 24, connected to the output of the frequency demodulator, responds and supplies a signal to the electronic switch 22, which is thus closed. After the termination of the interval of rest the output signal of the integrator 24 falls out and the switch 22 is opened.

In the auxiliary circuit the carrier signal, amplitude-modulated by the auxiliary signal, is brought by the controlled amplifier 17 to a substantially constant level and the signal is then detected by the detector 18. The filter 20, tuned to the frequency of the auxiliary signal, filters the auxiliary signal from the detected signal and supplies the auxiliary signal to an amplitude limiter 21, which converts the sinusoidal auxiliary signal to a square-wave auxiliary signal, which is fed through the closed switch 22 to the differentiator 23. The output pulses of the differentiator 23 corresponding to the flanks of the square-wave auxiliary signal are fed to the mixing gate 11. The gate 11 combines the output signals of the differentiators 10 and 23 and supplies them to the time signal generator circuit described above. The pulses supplied by the differentiator 23 control the phase of the time signal generated in the generator circuit during an interval of rest in the same manner as the output pulses of the differentiator 10 during the intelligence transmission, so that it is always ensured that the time signal has the correct phase at the beginning of an item of intelligence with respect to the then incoming sign elements. The amplitude variations of the carrier signal amplitude-modulated by the auxiliary signal and having the space frequency F1 are clipped by the amplitude limiter 7, so that in an interval of rest the receiver intelligence channel 7, 8, 9 is not affected by the amplitude-modulated carrier signal.

It is advantageous to choose the frequency of the auxiliary signal a factor $n$ lower than the frequency of the time signal oscillator 4. In the example shown the factor $n$ amounts to 4, so that the frequency of the auxiliary signal is 300 c./s. with a time signal frequency of 1200 c./s. It is thus ensured that only a narrow frequency band is required for the transmission of the amplitude-modulated carrier signal.

The output pulses of the differentiator 10 coincide with the transitions between the space and mark elements obtained by demodulation, so that the maximum repetition frequency of said pulses amounts to 1200 c./s. This value is attained only when alternately space and mark elements are transmitted. During the normal intelligence transmission the pulses occur irregularly, so that on an average they have a much lower repetition frequency and the pulses derived from the auxiliary signal and having a fixed repetition frequency of 300 c./s. occur while adequate frequency to provide an accurate control of the phase of the time signal.

Figure 3:
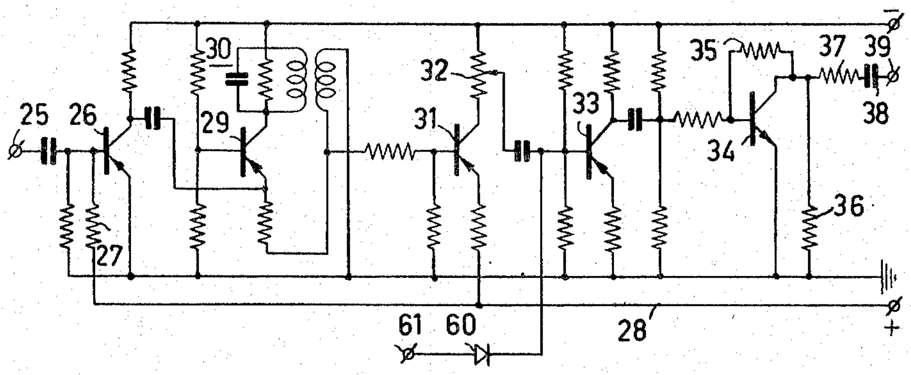
FIG. 3 shows the detail of part of the transmitting device shown in FIG. 1.

FIG. 3 shows in detail part of the transmitting device of FIG. 1. A square-wave time signal derived from the time signal oscillator 4 and having a frequency of 1200 c./s. is supplied to the terminal 25 and via a blocking capacitor to the base of a transistor 26. The transistor 26 is normally blocked via the resistor 27, which is connected to the positive supply conductor 28. During the trailing edges of the time signal the transistor 26 is conducting and supplies a positive pulse to the emitter of a transistor 29, so that the latter becomes conducting. By means of a resonant circuit 30, included in the collector circuit, and tuned to 300 c./s. a 300 c./s. oscillation is produced, which is positively fed back through a feedback winding to the emitter circuit, so that only one of four output pulses of the transistor 26 effectively acts upon the emitter of the transistor 29. The 300 c./s. oscillation produced is fed, subsequent to amplification by a transistor 31, from a variable tapping of the collector 32 to a further amplifying stage comprising a transistor 33 which is connected by its base to a terminal 61 via a diode 60. During the transmission of intelligence the voltage at the terminal 61 is positive so that the transistor 33 is normally blocked. In an interval of rest a negative voltage is fed from the intelligence producer 3 to the terminal 61, so that the diode 60 is cut off and the transistor 33 becomes conducting. The 300 c./s. signal amplified by the conducting transistor 33 is fed to the base of a symmetrical npn-transistor 34, which is negatively fed back from the collector towards the base via a resistor 35, so that the output resistance of this amplifying stage is modulated between the collector of the transistor 34 and earth by the 300 c./s signal fed to the base by the modulation of the current amplification factor of the transistor. The collector of the transistor 34 is connected through a network of a shunt resistor 36, a series resistor 37 and a series capacitor 38 to a terminal 39, which can be directly connected to the output of the frequency modulator 2. Thus in an interval of rest the carrier signal of the space frequency F1 is amplitude-modulated by the modulation of the impedance of the output circuit of the frequency modulator 2. The average value of the impedance of the terminal 39 to earth is adjusted by means of the network 36, 37 and 38 and the modulation depth can be adjusted by the control of the tapping of the collector resistor 32. In practice the modulation percentage may be 30%, so that at the receiver a phase control of the time signal generator circuit is obtained with a minimum effect on the intelligence channel 7, 8, 9, said control being nevertheless not very sensitive to interference signals.

Figure 4:
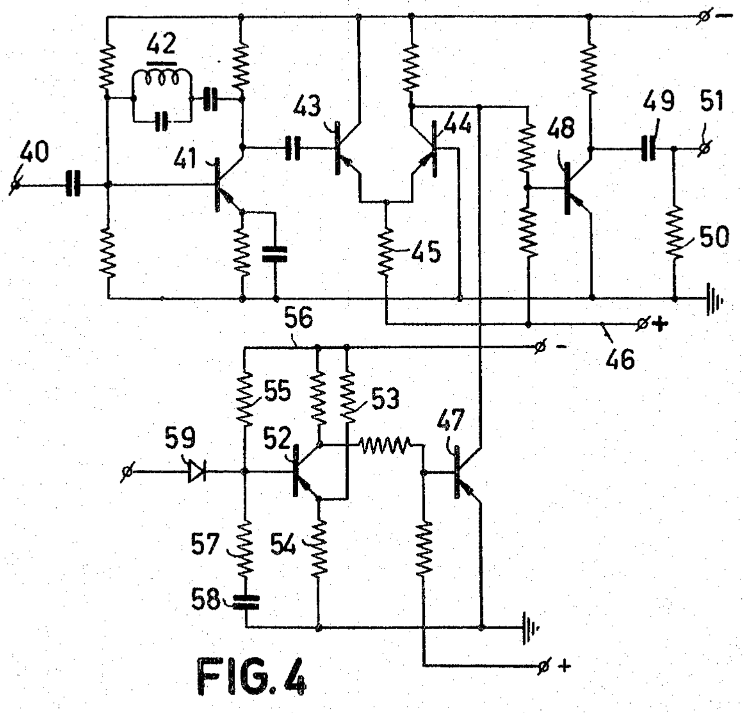
FIG. 4 shows in detail part of the receiving device shown in FIG. 2.

FIG. 4 shows in detail part of the receiving device of FIG. 2. The signal detected by the amplitude detector 18 is fed to the terminal 40 and through a blocking capacitor to the base of the transistor 41. The transistor 41 is negatively fed back from the collector to the base via a resonant circuit 42, tuned to the frequency of the auxiliary signal of 300 c./s., so that the detected signal fed to the base is amplified very selectively. The amplified auxiliary signal of 300 c./s. is supplied to an amplitude limiter, which is provided with the transistors 43 and 44, having a common emitter resistor 46, connected to a positive supply conductor 46. The base of the transistor 44 is connected to ground and the base of the transistor 43 is connected to the collector of the transistor 41, so that during the negative half periods of the auxiliary signal the transistor 43 is conducting and the transistor 44 is blocked, whereas during the positive half periods of the auxiliary signal the transistor 44 is conducting and the transistor 43 is blocked. During the intelligence transmission the collector of the transistor 44 is connected to ground through the emitter-collector path of the normally saturated and conducting transistor 47, so that no voltage variations occur at the collector of the transistor 44. In an interval of rest the transistor 47 is blocked and the square-wave auxiliary signal formed by the transistors 43 and 44 is fed, subsequent to amplification by the transistor 48, to a differentiator, which comprises a series capacitor 49 and a shunt resistor 50. Pulses corresponding to the flanks of the square-wave auxiliary signal are derived from the junction 51 of the capacitor 49 and the resistor 50 and fed in the manner described to the mixing gate 11.

For the control of transistor 47 there is provided an additional amplifying stage having an integrating effect and comprising a transistor 52, which is biased in the non-conductive direction through the resistors 53 and 54. The base of the transistor 52 is connected via a resistor 55 to the negative supply conductor 56 and through a resistor 57 in series with a capacitor 58 to ground. The output of the frequency demodulator 8 is connected via a diode 59 to the base of the transistor 52, so that during the intelligence transmission, owing to the alternately positive and negative output voltage of the frequency demodulator 8, the base of the transistor cannot become negative relative to the emitter, but after the beginning of an interval of rest the output voltage of the frequency demodulator is constantly negative. The diode 59 is thus blocked and the capacitor 58 is charged via the resistors 55 and 57 to such a negative voltage that the transistor 52 becomes conducting and the transistor 47 becomes non-conducting. After the termination of the interval of rest the capacitor 57 is rapidly discharged via the diode 59 and the resistor 57 as soon as the output voltage of the frequency demodulator becomes positive, so that the transistor 52 becomes non-conducting and the transistor 47 becomes conducting.

What is claimed is:

1. In a transmission system of the type comprising a transmitter having a source of coded signals in the form of mark and space elements, a source of oscillations, a source of continuous timing signals, means for frequency modulating said oscillations with said mark and space elements in synchronism with said timing signals, whereby said oscillations have a constant frequency in the absence of said coded signals, and means for transmitting said frequency modulated oscillations, and a receiver for receiving said signals comprising frequency demodulating means, time signal generating means connected to said demodulating means for generating time signals in response to transitions between mark and space elements in the signal output of said demodulating means, and pulse regenerating means connected to said demodulating means for regenerating said mark and space elements at instants determined by said time signals; means for controlling the phase of said time signals in the absence of transmission of said coded signals, said means for controlling said phase comprising means at said transmitter connected to said source of timing signals for generating an auxiliary signal, means at said transmitter responsive to the absence of said coded signals for amplitude modulating said constant frequency oscillations with said auxiliary signals, means at said receiver for amplitude detecting said received signals, and means at said receiver responsive to the absence of demodulation of successive mark and space elements by said demodulating means for applying the output of said amplitude detecting means to said time signal generating means.

2. A transmission system for the transmission of coded signals in the form of successively occurring mark and space elements, comprising a transmitter and a receiver, said transmitter comprising a source of said signals, a source of continuous timing signals, a source of oscillations, means for frequency modulating said oscillations with said coded signals in synchronism with said timing signals whereby said oscillations are modulated with first and second frequencies in response to said mark and space elements respectively and constant frequency oscillations are produced in the absence of said coded signals, a source of an auxiliary signal, means for amplitude modulating the output of said frequency modulating means with said auxiliary signal in the absence of said coded signals, and means for transmitting said frequency and amplitude modulated oscillations, said receiver comprising means for receiving said transmitted signals, frequency demodulator means for demodulating said received signals, time signal generating means, means connecting said generating means to said demodulator means for generating a time signal in response to the transitions between space and mark elements, pulse regenerating means connected to the output of said demodulator means for regenerating said mark and space elements in synchronism with said time signals, means for amplitude detecting said received signals, and means responsive to the absence of output signals of said demodulator means for applying the output of said amplitude detecting means to said time signal generating means for controlling the phase of the output of said time signal generating means in the absence of said mark and space elements.

3. A transmission system for the transmission of coded signals in the form of successively occurring mark and space elements, comprising a transmitter and a receiver, said transmitter comprising a source of said coded signals, a source of continuous timing signals, a source of carrier oscillations, frequency modulator means connected to said source of oscillations, means for applying said coded signals to said frequency modulator means in synchronism with said timing signals whereby said oscillations are modulated with first and second frequencies in response to the occurrence of said mark and space elements respectively and the output of said frequency modulator means has a constant frequency in the absence of said coded signals, means connected to said source of timing signals for producing an auxiliary signal, means responsive to the absence of said coded signals for amplitude modulating said constant frequency oscillations with said auxiliary signal, and means for transmitting said frequency and amplitude modulated oscillations, said receiver comprising means for receiving said transmitted oscillations, means for frequency demodulating said received oscillations, means connected to said demodulating means for deriving time signals from the transitions between mark and space elements of said received signals, pulse regenerator means connected to said demodulator means for regenerating said mark and space elements in synchronism with said time signals, means for amplitude detecting said received signals, and means responsive to the absence of signal output of said demodulator means for applying the output of said detector means to said time signal deriving means for controlling the phase of said time signals in the absence of said mark and space element.

4. The system of claim 3 in which said means for producing an auxiliary signal comprises frequency divider means, whereby said auxiliary signal has a frequency that is a submultiple of the frequency or said timing signal.

References Cited by the Examiner

UNITED STATES PATENTS

| | | | |
|---|---|---|---|
| 3,142,723 | 7/1964 | Fleming | 178—66 |
| 3,144,608 | 8/1964 | Warring | 325—30 |

DAVID G. REDINBAUGH, *Primary Examiner.*

B. V. SAFOUREK, *Assistant Examiner.*